(12) United States Patent
Paradiso et al.

(10) Patent No.: US 7,429,936 B2
(45) Date of Patent: Sep. 30, 2008

(54) PARASITIC MOBILITY IN DYNAMICALLY DISTRIBUTED SENSOR NETWORKS

(75) Inventors: Joseph A. Paradiso, Medford, MA (US); Mathew Joel Laibowitz, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/926,814

(22) Filed: Aug. 26, 2004

(65) Prior Publication Data
US 2006/0046664 A1 Mar. 2, 2006

(51) Int. Cl.
*G08G 1/123* (2006.01)
(52) U.S. Cl. .................. 340/988; 340/539.13
(58) Field of Classification Search .......... 340/988, 340/539.13, 539.11, 539.15, 825.36, 825.49
See application file for complete search history.

(56) References Cited

U.S. PATENT DOCUMENTS

| | | | | |
|---|---|---|---|---|
| 6,304,176 B1 * | 10/2001 | Discenzo | .............. | 340/539.26 |
| 6,762,724 B2 * | 7/2004 | Peng | ................... | 343/702 |
| 6,829,567 B2 * | 12/2004 | Michiwaki et al. | ......... | 702/188 |
| 6,842,689 B2 * | 1/2005 | Andres et al. | .............. | 701/110 |
| 6,975,222 B2 * | 12/2005 | Krishan et al. | ......... | 340/539.13 |

* cited by examiner

*Primary Examiner*—John Tweel, Jr.
(74) *Attorney, Agent, or Firm*—Charles G. Call

(57) ABSTRACT

A distributed sensor networks employing mobile sensing nodes that are carried to desired locations by attaching themselves to moving hosts and detaching themselves when the host arrives at the desired location or is moving away from the desired location. Each sensing node may carry a plurality of environmental sensors and communicates with nearby sensing nodes using a short range wireless link. The node further carries a location sensing mechanism and uses either active, passive or attractive means to attach itself to a moving host.

16 Claims, 8 Drawing Sheets

PARASITIC MOBILITY IN DYNAMICALLY DISTRIBUTED SENSOR NETWORKS

FIELD OF THE INVENTION

This invention relates generally, but in its broader aspects not exclusively, to distributed, wirelessly networked collections of sensors.

BACKGROUND OF THE INVENTION

We are at a point in time where advances in technology have enabled production of extremely small, inexpensive, and wirelessly networked sensor clusters. We can thus implant large quantities of sensors into an environment, creating a distributed sensor network. Each individual node in the network can monitor its local space and communicate with other nodes to collaboratively produce a high-level representation of the overall environment. By using distributed sensor networks, we can sculpt the sensor density to cluster around areas of interest, cover large areas, and work more efficiently by filtering local data at the node level before it is transmitted or relayed peer-to-peer [see Meguerdichian, S., et al. Localized algorithms in wireless ad-hoc networks: location discovery and sensor exposure. 2001. Long Beach, Calif., USA: ACM].

Furthermore, by adding autonomous mobility to the nodes, the system becomes more able to dynamically localize around areas of interest allowing it to cover larger total area with fewer nodes by moving nodes away from uninteresting areas. It is well suited to sampling dynamic or poorly modeled phenomena. The addition of locomotion further provides the ability to deploy the sensor network at a distance away from the area of interest, useful in hostile environments. Cooperative micro-robots can reach places and perform tasks that their larger cousins cannot [see Grabowski, R., L. E. Navarro-Serment, and P. K. Khosla, Small is beautiful: an army of small robots. 2003. 289(5): p. 42].

Mobility also allows the design of a system where nodes can seek out power sources, request the dispatch of other nodes to perform tasks that require more sensing capability, seek out repair, and locate data portals from which to report data [see Howard, A., M. J. Mataric, and G. S. Sukhatme, An incremental self-deployment algorithm for mobile sensor networks. 2002. 13(2): p. 113].

But the creation of mobile nodes is not without a price. Locomotion is costly in terms of node size and power consumption. In dense sensor systems, due to the large quantity of nodes and distributed coverage, it is difficult to manually replace batteries or maintain all nodes. Some researchers [see LaMarca, A., et al. Making sensor networks practical with robots. 2002. Zurich, Switzerland: Springer-Verlag] have explored using robots to maintain distributed networks, but this is difficult to implement over large, unrestricted environments. Additionally, the added intelligence and processing power required for a node to successfully navigate in an arbitrary environment further increases the power and size requirements of each node.

Large nodes, in physical size, complexity, cost, and power consumption, prevent the sensor network from being implanted in most environments. [see Sinha, A. and A. Chandrakasan, Dynamic power management in wireless sensor networks. 2001. 18(2): p. 62; see also see Rahimi, M., et al. Studying the feasibility of energy harvesting in a mobile sensor network. 2003. Taipei, Taiwan: IEEE.]

The present invention contemplates a novel type of mobile distributed sensor network that achieves the benefits of mobility without the usual costs of size, power, and complexity. In accordance with a feature of the invention, nodes are employed that harvest their actuation and local navigational intelligence from the environment. The node is equipped with the ability to selectively attach to or embed itself within an external mobile host.

Examples of such hosts include people, animals, vehicles, fluids, forces (e.g. selectively rolling down a hill), and cellular organisms. These hosts provide a source of translational energy, and in the animate cases, they know how to navigate within their environment, allowing the node to simply decide if the host will take it closer to a point of interest. If so, the node will remain attached; when the host begins to take the node farther away from a point of interest, the node will disengage and wait for a new host.

The invention provides a method for combining mobile sensor agents, dense distributed sensor networks, and energy harvesting. The detailed description which follows describes preferred hardware and software systems which combine these mechanisms using a technique here called "parasitic mobility."

Related Prior Work

Although the invention has no direct precedent, it is inspired by systems in nature and human society and it builds upon current work in the encompassed fields of distributed sensor networks and mobile systems. Wireless sensor networks have become a large area of research, with many universities and institutes contributing. Strategic seed programs begun in the 1990s such as DARPA's SENSIT initiative [see Chee-Yee, C. and S. P. Kumar, Sensor networks: evolution, opportunities, and challenges. 2003. 91(8): p. 1247] have grown into an international research movement. Early work on highly distributed computation and sensor networks at MIT that provides the lineage to this project can be traced back to the Laboratory of Computer Science's Amorphous Computing Group's research in emergent and self-organizing behaviors in computer systems [see Abelson, H., et al., Amorphous computing. 2000. 43(5): p. 74.] This research conducted software simulations that provided a basis for designing distributed, cooperative systems, leading to the Paintable Computing [see Butera, W. J., Programming a Paintable Computer, in Program in Media Arts and Sciences. 2002, Massachusetts Institute of Technology: Cambridge, Mass.] paradigm proposed by Bill Butera of the MIT Media Lab's Object Based Media Group. This platform has progressed from software simulation to the very recent development of hardware implementing a distributed sensor network comprised of about 1000 nodes.

The Responsive Environments Group at the MIT Media Lab designed an earlier versatile sensor network test-bed inspired by the Paintable Computing concept called the Push-Pin computing platform [see Lifton, J., et al. Pushpin computing system overview: a platform for distributed, embedded, ubiquitous sensor networks. 2002. Zurich, Switzerland: Springer-Verlag], which can support over 100 nodes arbitrarily placed atop a 1×1 meter power substrate. Their subsequent interest in electronic skin as an ultra-dense sensor network [see Joseph A. Paradiso, Joshua Lifton, Michael Broxton, Sensate Media: Multimodal Skins as Dense Sensor Networks. BT Technology Journal, 2004] resulted in the creation of the "Tribble" project [see Lifton, J., M. Broxton, and J. A. Paradiso. Distributed sensor networks as sensate skin. 2003. Toronto, Ont., Canada: IEEE.], a large sphere tiled by a hardwired multimodal sensor network. These systems consist of many nodes instrumented with environmental sensors that can communicate with each other to form a global picture of their situation.

All the above projects illustrate many ideas in distributed sensor networks that motivate this research and provide a basis for the design of a system useful in experimenting with the concept of parasitic mobility. The Smart Dust Project at UC Berkeley [see Kahn, J. M., R. H. Katz, and K. S. Pister. Next century challenges: mobile networking for "Smart Dust". 1999. Seattle, Wash., USA: ACM.] has set a theoretical goal for extremely small nodes in dense embedded sensor networks. While the project itself did not put an actual hardware platform into production, it spun-off into the Mote [see Warneke, B., B. Atwood, and K. S. J. Pister. Smart dust mote forerunners. 2001. Interlaken, Switzerland: IEEE.] and more recently the Spec [see Hill, J., Spec takes the next step toward the vision of true smart dust. 2003. http://wwwjlhlabs.com/jhill_cs/spec/]. The Mote is currently the most popular platform for experimenting with compact wireless sensing. It has also served as a building block for many mobile sensor agent projects, all of which essentially involved putting a Mote onto some sort of robot [see LaMarca, A., et al. Making sensor networks practical with robots. 2002. Zurich, Switzerland: Springer-Verlag.]. The Spec is the current result of a project intended to shrink down the Mote to the theoretical goal of the Smart Dust project. While not yet that small, the Spec is around 4 mm×4 mm (not including the battery or antenna) and will open the door for many dense sensor array experiments.

Similar work is also proceeding at other institutions (e.g. The National Microelectronic Research Center in Cork, Ireland [see Barton, J., et al. Development of distributed sensing systems of autonomous micro-modules. 2003. New Orleans, La., USA: IEEE.]); the research community is congealing around the goal of producing millimeter sized multimodal wireless sensor nodes. Parasitic Mobility is intended as a means to add mobility to systems built to meet the specifications of these projects with regards to size, power, and node complexity; as the nodes grow smaller, parasitic mobility becomes increasingly feasible and desirable. As the power source remains a problem, current research in energy scavenging is very relevant to this initiative [see Thad Starner, Joseph A. Paradiso, Human Generated Power for Mobile Electronics. In C. Piguet (ed), Low Power Electronics, CRC Press, 2004.] and adaptive sensing [see Mohammad Rahim, Richard Pon, William J. Kaiser, Gaurav S. Sukhatme, Deborah Estrin, and Mani Srivastava, Adaptive Sampling for Environmental Robots, in UCLA Center for Embedded Networked Sensing Technical Report 29. 2003, University of California at Los Angeles: Los Angeles, Calif.].

Adaptive sensing is the technique by which sensing capabilities (active sensors, sampling rate, power consumption, bit-depth, transmission, processing) are increased and decreased according to the sensor data itself, never decreasing below a level capable enough to determine when more sensing power is necessary. Such approaches are currently being implemented using the Stack Sensor Platform [see Benbasat, A. Y., S. J. Morris, and J. A. Paradiso. A wireless modular sensor architecture and its application in on-shoe gait analysis. 2003. Toronto, Ont., Canada: IEEE.] at the MIT Media Lab. The Networked InfoMechanical Systems research area at the Center for Embedded Networked Sensing at UCLA conducts research and builds systems to investigate adaptive sensing [see Mohammad Rahim, Richard Pon, William J. Kaiser, Gaurav S. Sukhatme, Deborah Estrin, and Mani Srivastava, Adaptive Sampling for Environmental Robots, in UCLA Center for Embedded Networked Sensing Technical Report 29. 2003, University of California at Los Angeles: Los Angeles, Calif.] and mobility for distributed sensor networks [see William J. Kaiser, Gregory J. Pottie, Mani Srivastava, Gaurav S. Sukhatme, John Villasenor, and Deborah Estrin, Networked Infomechanical Systems (NIMS) for Ambient Intelligence, in UCLA Center for Embedded Networked Sensing Technical Report 31. 2003, University of California at Los Angeles: Los Angeles, Calif.].

The MIT Laboratory for Computer Science's Network and Mobile Systems group has conducted substantial research in wireless and sensor networks. Several of their projects are directly related to the work of this thesis. They include a protocol for networking Bluetooth nodes [see Law, C., A. K. Mehta, and K. Y. Siu, A new Bluetooth scatternet formation protocol. 2003. 8(5): p. 485.] and the LEACH protocol for sensor networking [see Heinzelman, W. R., A. Chandrakasan, and H. Balakrishnan. Energy-efficient communication protocol for wireless microsensor networks. 2000. Maui, Hi., USA: IEEE Comput. Soc.]. These are examples of self-configuring network protocols that support mobile nodes of any variety including parasitically actuated.

And finally, while not distributed sensor networks, there are several mobile sensor devices built by attaching large sensor packages to floating platforms that drift about in ambient flows while collecting data. Some examples include Sonobuoys [see Houston, Kenneth M.; Engebretson, Kent R., The Intelligent Sonobuoy System—A Concept for Mapping of Target Fields, in Draper Laboratories, D. Laboratories, Editor.] that acoustically hunt for submarines, drifting instrumentation packages to monitor ocean temperature [see James D. Irish, Walter Paul, J. N. Shaumeyer, Carl C. Gaither, III, and John M. Borden, The Next-Generation Ocean Observing Buoy in Support of NASA?s Earth Science Enterprise. Sea Technology, 1999 (40): p. 37-43], and balloon-borne modules for surveillance and proposed planetary exploration [see Kerzhanovich, V. V., J. A. Cutts, and J. L. Hall. Low-cost balloon missions to mars and venus. 2003].

Parasitic Mobility in Nature

The natural world provides us with many examples of parasitic mobility, including organisms that rely entirely on larger organisms to carry them to habitable locations. Parasitic relationships of this sort are called phoretic relationships from the word phoresis, which literally means transmission [see Albert O. Bush, Jacqueline C. Fernandez, Gerald W. Esch, J. Richard Seed, Parasitism: The Diversity and Ecology of Animal Parasites. 2001, Cambridge University Press: Cambridge, UK. p. 391-399]. These examples may be separated into three categories:

(1) active parasitic mobility consisting of organisms that attach and detach at will from hosts with their own actuation,
(2) passive parasitic mobility consisting of passive nodes that are picked up and dropped off, knowingly or unknowingly, by hosts, and
(3) value-added parasitic mobility which consists of either passive or active parasitic organisms that provide additional value to the host in exchange for transportation.

Each of these categories of parasitic mobility will be discussed briefly below:

Active Parasitic Mobility

The first example that comes to mind when discussing parasites in nature is the tick. The tick actively attaches to hosts by falling from trees or by crawling directly onto the host. It remains attached by using an actuated gripping mechanism which it can release whenever it decides to seek food elsewhere. Although the tick is transported to new locations by the host, its primary reason for attachment is to use the host as a source of food. It is therefore not normally considered a phoretic organism, but is a leading example of an active attachment mechanism.

Several species of nematodes, a.k.a. round worms, exhibit phoretic behaviors. The *Pelodera Coarctata* is a nematode that is commonly found living in cow dung. When the conditions in the dung deteriorate and become inhospitable for the nematode, it attaches itself to a dung beetle which will carry it to a new fresh dung pat. [see Albert O. Bush, Jacqueline C. Fernandez, Gerald W. Esch, J. Richard Seed, Parasitism: The Diversity and Ecology of Animal Parasites. 2001, Cambridge University Press: Cambridge, UK. p. 160-196.] Another such nematode is the *Onchocerca Volvulus* which is infamous as the cause of "River Blindness." This worm attaches itself to Blackflies that in turn bite humans allowing the worm to travel through the skin and infect the host human. These Blackflies themselves are also an example of parasitic mobility. Their larvae require an aquatic stage for growth, so they often attach themselves to freshwater crabs to bring them into the water and protect them. [see Albert O. Bush, Jacqueline C. Fernandez, Gerald W. Esch, J. Richard Seed, Parasitism: The Diversity and Ecology of Animal Parasites. 2001, Cambridge University Press: Cambridge, UK. p. 160-196.]

Marine life is ripe with examples of active parasitic mobility. One example is that of the Remora or Suckerfish. These fish have developed a sucker-like organ that they use to attach to larger creatures such as sharks or manta rays. By attaching to these larger, faster animals the remora covers area faster giving it more access to food. [see Albert O. Bush, Jacqueline C. Fernandez, Gerald W. Esch, J. Richard Seed, Parasitism: The Diversity and Ecology of Animal Parasites. 2001, Cambridge University Press: Cambridge, UK. p. 306-310.]

Passive Parasitic Mobility

Plants often employ parasitic mobility as a means of distributing seeds. A common example of this is the dandelion. The dandelion seeds have a tiny parachute that carries the seed with the wind. This allows the seeds to travel some distance in hopes of landing in an area that provides the requirements of growth. It is completely passive and at the whim of the wind. It is not expected that all the seeds will land in arable areas. This is overcome by the sheer quantity of seeds released into the air. This is more opportunistic than parasitic, but still falls within the conceptual boundaries of this research. Other plants, with behaviors more aptly described as parasitic, distribute their seeds in bur casings. These prickly cases stick to animals that brush up against them or step on them. They are shaken lose or fall off as a result of shedding, usually at a new location.

Value-Added Parasitic Mobility

Fruit-bearing trees distribute their seeds in a value-added method. Animals gather the fruits as a food source and in turn spread the discarded seed-containing cores. This attraction and provision acts as an attachment mechanism for the seeds. The detachment mechanism is the inedibility of the seeds within the fruit, in other words, when the added value has been used up. Flowers use their scented petals to attract bees and other insects. The flowers also provide nectar. The bees use the nectar to make honey and carry the pollen from flower to flower. This is an extremely well evolved symbiotic system that has very little wasted energy or resources. [see Albert O. Bush, Jacqueline C. Fernandez, Gerald W. Esch, J. Richard Seed, Parasitism: The Diversity and Ecology of Animal Parasites. 2001, Cambridge University Press: Cambridge, UK. p. 6-9]. The existence of many such well evolved systems in nature illustrates the validity of this type of mobility.

Parasitic Mobility in Society

In human society, many of the systems surrounding us exhibit emergent behaviors that exemplify parasitic mobility. It is important to examine these systems, not only as conceptual examples, but also because it may be possible to embed sensor network technology directly into these existing systems and take advantage of their mobility. Basic examples, such as people being pulled along by a bus, exist throughout society. It is often beneficial to attach to something that can travel in ways that a person cannot. The example further illustrates the economies of parasitic mobility, as the people are getting a free ride.

A simple example of parasitic mobility is when a lost object, such as a cellular phone, is returned to its owner. This method of actuation is a combination of the device identifying its destination and a desire for the host to bring it there. Keeping this in mind, it may be possible to design devices that could identify some sort of reward for bringing them to a point of interest to the device. Another example of this behavior is that of a consumer survey (a sensor of sorts) that is redeemable as a coupon when returned. There are many everyday objects that are only useful for short bursts. One example of this is a writing utensil. A pen is needed to record information when it is presented or invented; afterwards the pen sits dormant awaiting the next burst of usefulness. During this period where the pen is not deemed useful it is free to be relocated. It is often relocated by a host requiring its use in another location. As a result, pens generally cover large areas over time, and due to their unlikelihood of being returned, people usually have redundant supplies of pens. Equipping pens with a sensor device is a good way to gain coverage of an environment, particularly an office or academic institutional building.

Fictional Examples of Parasitic Mobility

Some popular works of fiction have played with a few ideas that relate to parasitic mobility. The concept of people hanging onto vehicles for free rides has been taken further by Neal Stevenson in his novel Snow Crash [see Stevenson, N., Snow Crash. 1992: Bantam Books]. In Snow Crash, hitching rides on other vehicles via futuristic skateboards equipped with magnetic grapplers to latch onto cars is presented as a major method of transportation in the future setting of the story. In the movie Twister [see de Bont, Jan, Twister. 1996, Warner Bros.: USA]. a team of storm-chasers release a batch of sensors into a tornado. The sensors, collectively called 'Dorothy', are sucked up into the vortex and collect data about the tornado from the inside. These sensor nodes are carried into the area of interest by winds themselves. In this case the sensor nodes are used to study the actuation force itself, and is mobile along with the force thereby always being at the area of interest. Although it seems possible that this system can be deployed, according to the National Severe Storms Laboratory [see The National Severe Storm Laboratory, FAQ. http://www.nssl.noaa.gov/faq/vortex.shtml], such devices have not been built. They have experimented with a large barrel-sized sensor device called TOTO (TOtable Tornado Observatory), but these tests have yielded only minimal success.

Finally, the most famous example of an object that travels without its own actuation is 'The One Ring' from the "Lord of the Rings Trilogy." [see Tolkien, J. R. R., The Lord of the Rings. 1954-1955, London: George Allen & Unwin]. This ring calls out to potential hosts to pick it up, and even renders the wearer invisible as a value-added service. And finally, the ring desires to be brought to a location which also happens to be the only place it can be destroyed; a promised reward for its successful journey.

SUMMARY OF THE INVENTION

The preferred embodiment of the invention takes the form of methods and apparatus for transporting a sensor capable of wireless communication to a desired location by coupling the sensor to a moving host such that the host carries the sensor with it, the coupling being maintained until the sensor has either been carried to the desired location or it is determined that the host is carrying the sensor away from the desired location.

Parasitic mobility may also be used to advantage in connection with nodes without sensors—e.g., to move wireless relay nodes to locations where they can route messages through gaps in network coverage. In addition, the host that is used to provide mobility to a node may take a variety of forms, including a vehicle, a human, an animal, or any other physically moving object or fluid that can carry a node from place to place.

As described in more detail below, the present embodiment forms a sensing network comprising a plurality of sensing nodes, each given sensing node consisting of:
- at least one sensor for measuring a condition in the vicinity of sensor,
- a wireless communications device for exchanging data with other sensing nodes in the network that are nearby,
- some means for attaching each sensing node to a moving host,
- some means for subsequently detaching the sensing node from the moving host when it has been carried to a specified location.

For active nodes, the means for attaching the node to a moving host may include a mechanism for propelling the node into contact with a moving host and some means for securing the node to host when the two are in contact. For passive nodes, the means for attaching the sensing node may be an adhesive, a set of hooks, or some other means affixed to the surface of the sensing node for attaching the node to the moving host. Attractive passive hosts may use some means for inducing a moving host to acquire the node and thereafter carry it for at least a limited time.

The sensing node further advantageously includes some means for detaching itself from the moving host, or for encouraging the moving host to cease carrying the sensing node, when it has been transported to the specified location or when it is determined that the moving host is carrying the node away from the specified location.

The specified location may be transmitted to the node via the network, and a new specified location may be declared after the sensing node has accomplished its objectives at a first location. The system may employ a database listing both desirable nodes and undesirable nodes, with the specified node being chosen from the set of desirable nodes and/or being prohibited from being one of the undesirable nodes. As a sensor moves from location to location gathering information, it may identify new desirable and undesirable locations and communicate these locations to the other nodes.

BRIEF DESCRIPTION OF THE DRAWINGS

In the detailed description which follows, frequent reference will be made to the attached drawings, in which.

DETAILED DESCRIPTION

Overview

The preferred embodiment of the invention consists of a wireless network of sensing nodes which are carried by moving hosts to desired locations. Each sensing node includes an internal power source, one or more sensors, a wireless communications unit for exchanging information with other nodes, and a supervisory control processor. A block diagram of a single node is seen in FIG. 1, and a network of such nodes is shown in FIG. 2.

In the description that follows, each sensing node will frequently be referred to as a "paramor," a name given to a parasitically mobile node (an anagram for PARAsitic MObility Research).

Figure 1:
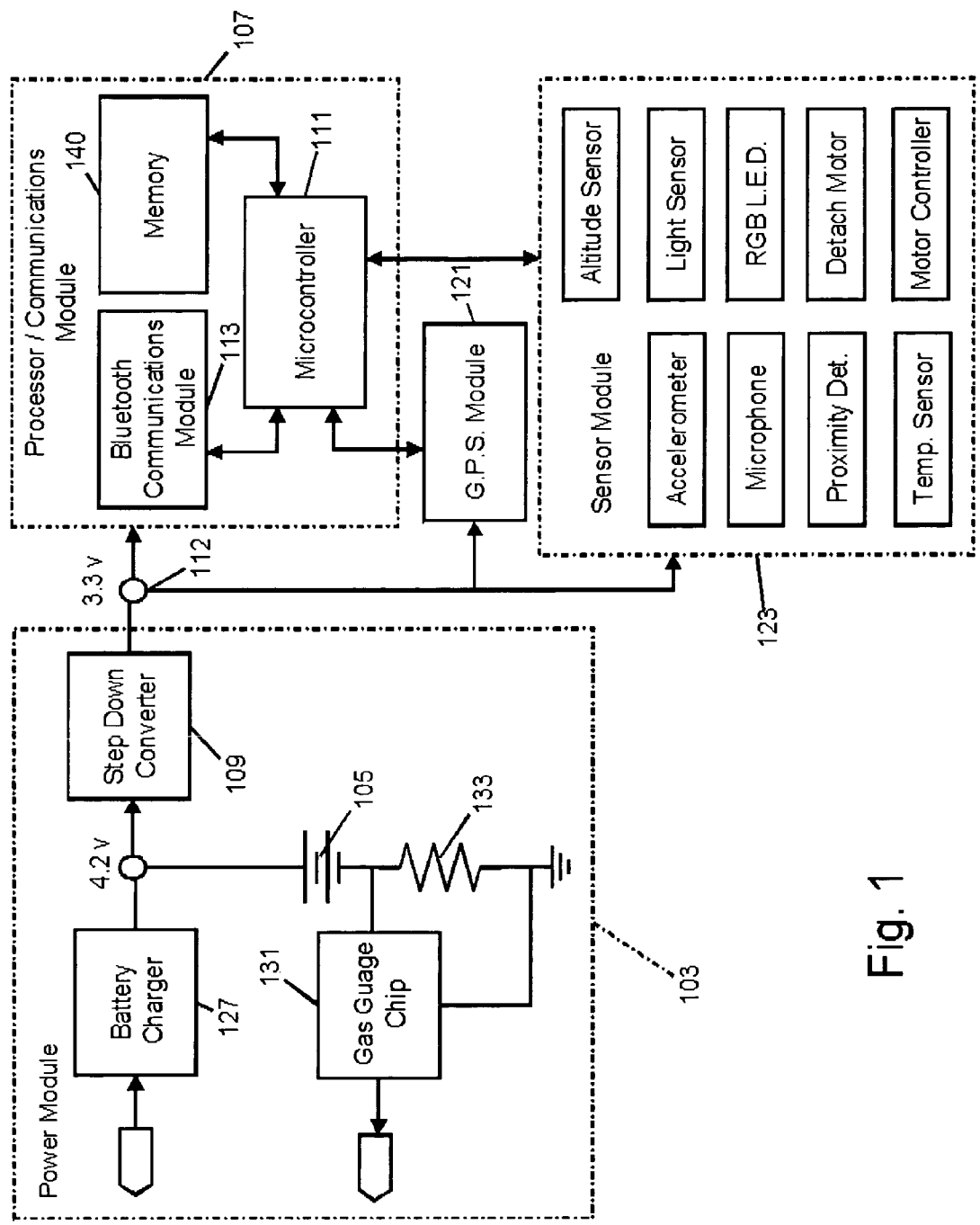
FIG. 1 is a block diagram showing the components of a preferred embodiment of a sensing node of the type contemplated by the invention.

As seen in FIG. 1, each sensing node in the network contains all the necessary elements for processing, communication, data storage and includes a location system, a suite of sensors, and an onboard rechargeable power source. The power module seen at 103 supplies power to the other components from a rechargeable battery 105. A processing and communication module 107 includes a microcontroller 111 which provides processing and supervisory control, and a Bluetooth communications module 113 through which data is exchanged with other sensing nodes in the network that are nearby, or with a nearby communications base station (as seen at 203 in FIG. 2). A Global Positioning System (GPS) module seen at 121 in FIG. 1 provides geographical position data that permits the sensing unit to determine is current location. Finally, the sensing node includes a sensor module 123 that includes several different kinds of sensors as well as mechanisms that are employed to couple and decouple the sensing node with moving objects which the node uses parasitically to move itself to desired location(s).

Figure 2:
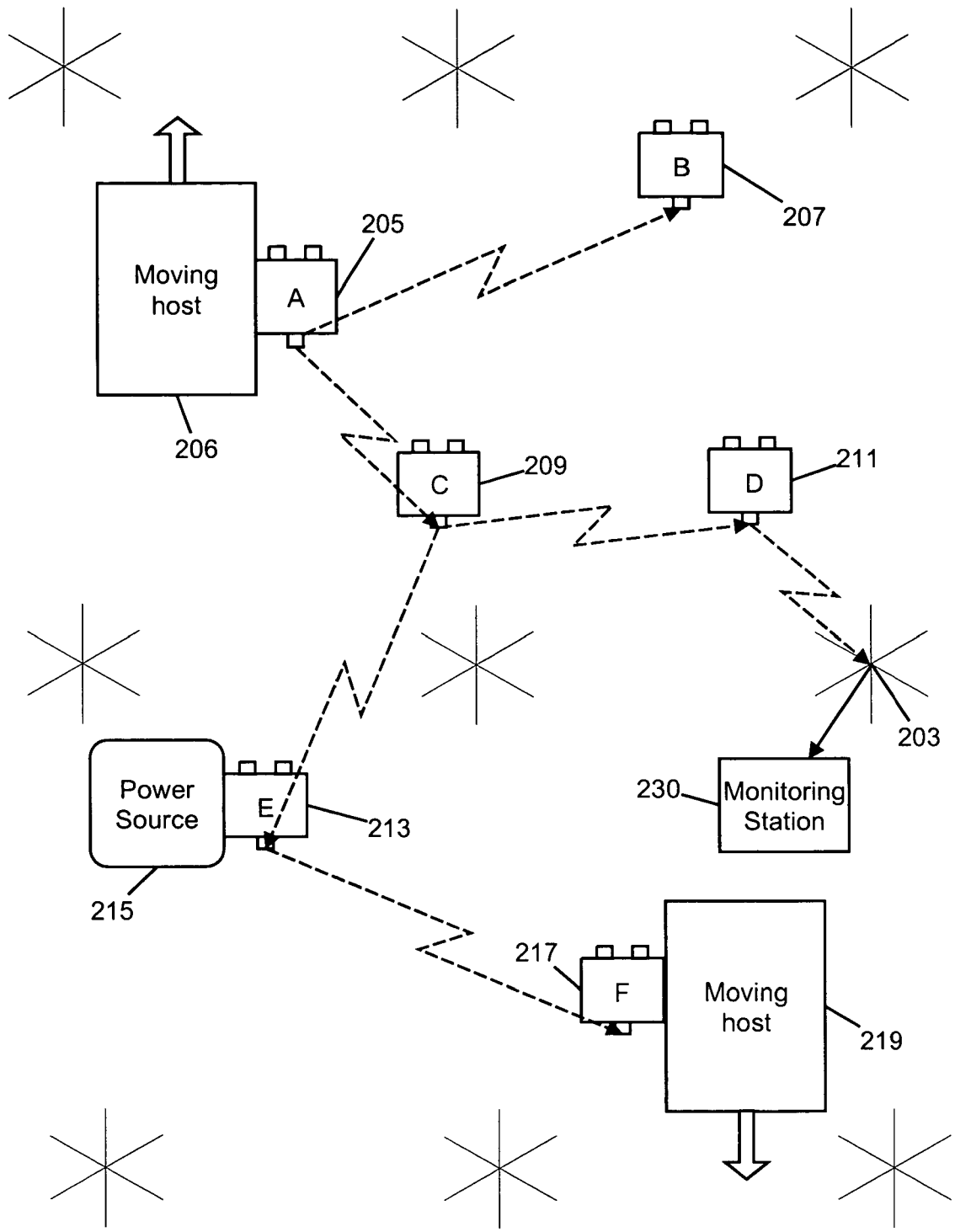
FIG. 2 illustrates a network of sensing nodes, each of which may be carried to a desired location by attaching itself to a moving host.

Each node seen in detail in FIG. 1 may be one of many nodes each forms one part of a network of sensors illustrated in FIG. 2. Each node communicates with nearby nodes and/or with a nearby base station via a short range wireless link. For example, the node A at 205 which is being carried to a new location by a moving host 206 communicates with its neighboring nodes B and C at 211 and 213 respectively. Node C at 209 is within range of the nodes D at 210 and E at 211. The node D at 210 is near to and communicates with a Bluetooth beacon 203 (one of several) that is coupled by wired or wireless link to a monitoring station 230. The node E seen at 213 has been carried to the vicinity of and is obtaining power from the power source 215 to recharge its internal battery. Finally, the node F at 217 is being carried to a different location by having attached itself to a moving host 219.

The network of nodes may take many different forms, such as a single communication link between a moving node and a single base station, or a multinode network of links organized in mesh, star, bus, tree and/or ring topologies connecting moving nodes and/or stationary base or relay stations to one another using a variety of communication links, including radio (e.g. Bluetooth™ or WiFi IEEE 802.11), infrared (e.g. IrDA), or wired connections.

A location that provides electrical energy for recharging can take a number of forms. It may transfer power to the nearby node through inductive coupling, RF or optical coupling, or a direct connection to an energy source. Alternatively, the location can exhibit ambient energy that can be harvested (e.g., a place with strong sunlight that can be converted to energy using solar cells carried by the node). These identity of these power source locations can be both preprogrammed (or dynamically uploaded) into the device's memory or discovered by onboard sensors as the node roams around on its host.

Kinetic power scavenging may be used to transfer energy from a source location to a moving node. For example, the node may position itself on a vibrating platform or attach itself to a vibrating surface, and employ internal mechanisms to convert the mechanical energy into electrical energy to charge the battery (e.g. vibrating a magnet in the vicinity of a pickup coil). Additionally, a temperature sensor in the node may be used to seek out heat sources, which can be converted to electric energy using thermoelectric Peltier modules.

Each node in the network is capable of storing sensor data from its own sensors and from other sensing nodes when they are nearby, and relaying that stored data to a base station, possibly via other sensing nodes, so that the monitoring station 230 ultimately receives the combined sensing data from all of the nodes in the network.

Software Simulation

In order to better delve into and examine the concept of parasitic mobility, extensive software simulation was performed. Through the process of designing the software simulator, the proposed systems were examined from the ground up, looking at all the factors that influence a potential sensor network of this type. The design of the software simulator can be broken down into three sections:

Environmental simulation,
Host behavior, and
Paramor (sensing node) behavior.

On top of these areas, the simulator contained all the necessary hooks for interactively changing behaviors and trying out new algorithms, detailed logging of activity data, and unattended running of multiple simulations with a desired timescale. The simulator is grid based, and has been tested with maps as large as one million cells. The hosts and paramors participating in the simulation move by transitioning from cell to cell.

Parasitic Node Behavior Simulation

The basics behind a parasitically mobile node's behavior are a set of objectives for the node. When a node is idle and a host body comes in range of it, the node attaches to the host. While attached to the host, the node uses the information it can gain from the environment and host to determine if detaching will help it reach its objectives.

The simulator accepted the assignment of objective and behavior parameters to each of the named behaviors assigned to paramor nodes in the map editor. Those parameters are:

Power Rate—This is the amount of power the node uses per 1000 units of simulator time.

Attachment Power—This is the amount of power used for each attachment or detachment the node performs.

Battery Life—This is amount of power the node has available. When this runs to zero, the node dies.

Power Threshold—When the node's power level drops below this threshold, it enters a mode searching for power sources. In this mode, it will always detach if near a source of power.

Goal X/Y—The coordinates that the node is told to head towards.

Goto Goal—If this is checked, the node will try and reach the location stored in Goal X/Y. If it is unchecked, the value stored in Goal X/Y is ignored.

Stop at Goal—If this is checked, when the node reaches the location stored in Goal X/Y, it will remain there indefinitely.

Goal Time—This is the duration a node will stay at its goal if Stop at Goal is not checked. After the time is up, it will attach to the next host that comes by and start looking for a new area of interest.

Light/Vibration/Altitude/Temperature/Radiation Threshold—These values tell the node what constitutes an area of interest. If the area contains quantities of these elements above the threshold value, it considers it interesting and will detach to start sensing. Setting these values to 100 disables checking for that element as values over 100 are not available in the map editor.

Sensor Time—This is the duration that a node will stay at a sensor point of interest before trying to seek a new location.

Coverage—If this is checked, the node will take into consideration where it has already been when deciding to remain attached or to detach. This is useful for applications that are looking for sensor points of interest, or trying to cover an entire area for reconnaissance.

Hops Per Locale—When a node attaches to a new host and determines that the host is taking it in an undesirable direction, the node has the ability to hop off. However, it is possible that the node is at a spot where the only route that the host can take it is undesirable. The Hops per Locale setting assigns the maximum number of detachments the node should perform before it should stay on the host and ride to a new location. At this new location it can begin the process over again.

Once the above parameters are set up, the paramor behavior is easily implemented in the simulation environment. When a host comes within range, the paramor attaches. If it comes across an area of interest it will hop off and remain there for the specified duration. The power calculations are constantly being updated, and when it crosses the power threshold the node will not detach at a sensor point, only at a power location. It is possible to change these priorities. For example, if it is okay to risk running out of power in order to find something, the power can be lowered in priority below sensor events or destinations.

In general, if the node has a set destination, it will try to reach it. If it comes across an area of sensor interest, it will detach, stay for the sensor duration, and then try to continue towards its destination.

If a node is on a path to a destination or trying to go to where it has not been, it needs to hop off when it is on a host that is taking it farther away from its destination, or back into a covered area. This is a matter of simply calculating the distance to the destination at two points on the trajectory and testing the change in distance to the destination, or figuring out the direction and comparing it to the node's stored coverage map. It is important to allow the node to travel a distance long enough to sense the direction before hopping off. The "hops per locale" parameter is used to prevent situations with nodes being stuck as described above.

The following section describes the design and implementation of an actual parasitically mobile sensor network, which takes into account all the quantitative and qualitative identified above.

Hardware System

Electronics Design

To test the concept of parasitic mobility in a real-world setting, a hardware system comprised of electronic nodes equipped with all the necessary elements to implement the specific ideas introduced through the software simulation was designed and built. The nodes required processing, communication, data storage, a location system, a suite of sensors, and an onboard rechargeable power source. The electronics was also designed to facilitate experimentation with different types of attachment and detachment mechanisms.

The electronics were designed as small as could be easily built by hand using easy to obtain components. The design is based on stackable layers each approximately one square inch in size. When four layers are stacked, they are less than one inch high. More details on the mechanical specifications of the node hardware are given following the breakdown of the individual layers.

Power Module

The power module shown within the dashed-line rectangle 103 in FIG. 1 employs a Lithium Polymer rechargeable battery 105. Lithium Polymer (LiPo) was the chosen battery chemistry because it provides high charge density (capacity with respect to volume, an important factor in making each sensor node as small as possible.

The power module also needs to be able to switch off the battery when an external power source is present (such as the source seen at 213 in FIG. 2) and power the node from this source as well as recharge the battery using the charging circuit 127. This requirement facilitates harvesting power from the environment whenever power is available and makes the switch transparent to the node systems. The power module also contains a highly efficient step-down converter seen at 109 that provides a regulated 3.3V to the rest of the node via the output terminal 112. The battery 105 at full charge provides a voltage of 4.2V. When the battery drains and the voltage drops below 3.3V, the step-down converter 129 allows the battery voltage to pass through directly. When the battery drops below 3V the step-converter turns off and stops draining the battery. Draining a lithium polymer battery below 3V can destroy the battery, so this feature acts as a battery protection circuit.

The last feature of the power module is a gas gauge chip 131. This chip uses a 0.02 ohm current sense resistor 133 to monitor battery usage and calculate remaining battery life in seconds. The gas gauge chip 131 provides a HDQ digital interface connected to the microcontroller 111 to allow the microcontroller to query the battery life information.

Processing

The microcontroller 111 was implemented using a Silicon Labs C8051F311 microcontroller. This processor consumes low power, and operates at a lower frequency to be even more energy efficient when placed in a low power mode while keeping the analog peripherals and internal timers sufficiently alive to wake the processor. By alternating between these two frequencies the battery usage can be minimized.

This processor is a fully-featured mixed signal processor with a hardware SPI controller, hardware UART, hardware I2C controller, 4 PWM/Frequency generator outputs, and a 17 input 10-bit analog-to-digital converter. It has 1.2K of internal RAM and 16 KB of flash for program storage. The C8051F311 comes in a 5 mm-square leadless MLP package, making it the smallest processor available at the time of design with the peripherals needed for the Paramor node.

Lastly, the processing layer of the paramor node also contains an Atmel Dataflash memory chip seen at 140 with a capacity of 16 MB. This storage is required to store the firmware for the GPS module 121, which requires 1 MB of storage, and to store collected sensor data for later retrieval or transmission.

Communication

Each node is equipped with a wireless communication system seen at 113 to allow nodes to communicate with each other for distributed sensing applications, passing of navigational information, and cable-less retrieval of data from nodes.

Currently, the mobile telephone industry has driven down the size and power consumption of Bluetooth modules, and Bluetooth is easily interfaced to (if not already connected) by PCs and other devices. For these reasons Bluetooth was chosen as the wireless protocol and hardware. Bluetooth modules are available with embedded antennas and communication ranges up to 100 meters in a 13 mm by 24 mm package.

The specific Bluetooth module used was the BR-C11A Class 1 Bluetooth module from BlueRadios, Inc [see BlueRadios, Inc. http://www.blueradios.com] which includes an antenna and has a Bluetooth protocol stack programmed directly into the module itself. This allows complete control of the Bluetooth radio via simple UART commands. The protocol stack conforms to the Specification of the Bluetooth System, Volume 1, Version 1.1 (Feb. 22, 2001) available at https://www.bluetooth.org/spec/. The embedded Bluetooth stack supports Bluetooth Inquiry to find other devices in range and can connect to and communicate with 7 nodes simultaneously. It is easy to discover, register, connect, and disconnect nodes allowing large-scale peer-to-peer networks to be generated. Other wireless networking protocols, such as 802.11, the emerging Zigbee and 802.15.4 standards, or custom-designed, nonstandard networking algorithms can also be appropriate for this system.

Sensor Suite

The sensor and actuation module 123 contains the following input and output mechanisms:

a 2 Axis Accelerometer—used to determine if the node has been picked up or dropped off, as well as for collecting vibration and inertial data;

a Microphone—used to collect audio data from the environment;

an Active Infrared Proximity Sensor—used to test node distance from an external object or used to test presence of a potential host;

a Temperature Sensor—used to collect environmental data;

a Light Sensor—used to collect environmental data;

a RGB LED—used to display status and sensor information, as well as to act as a signal or attractive device to potential hosts;

a Pager Motor—used as a detachment device in the semi-passive node design or to signal a host to release the nod; and a Motor Controller—used to control an external motor used for attachment and detachment in the active node design.

The sensor module 123 also contains the analog circuitry (not shown) necessary to interface the sensors and outputs to the microcontroller 111. Other sensors, such as a digital camera chip, chemical sensors of various sorts, biological sensors, radiation detectors, a radio receiver looking for particular signals, a pyroelectric detector, and optical, sonar, capacitive, inductive, or magnetic proximity sensors, can be incorporated into this system.

Location System and Monitor System

Each node needs to be equipped with a system for placing itself in the environment. The first location system designed for this system is a GPS module shown at 121 in FIG. 1.

The design of the GPS layer is based around the Motorola FS OnCore single chip GPS module. This module can work in Assisted Mode (which requires a GPS beacon) and Autonomous Mode. The design of the GPS layer includes the Motorola Module, a Yageo Embedded GPS Antenna, and the required power supply components. The GPS system also requires enough storage to store the GPS firmware, which is provided by the memory 140 as noted above, and a processor capable of writing this firmware into the GPS module over its SPI interface at boot time, a function performed by the microcontroller 111.

A prototype GPS module was built using the sample FS OnCore chip included in the development kit. Using the Assisted GPS mode, a position fix, accurate within a few meters, could be achieved in one second using 75 mW of power. While not working on a position fix, the module could be put into a sleep mode where it will draw only a few micro-amps. The GPS module worked decently indoors (with the Assisted-GPS beacon placed in front of a window) and outdoors and proved itself as a usable location system for this application.

The second location system is a series of Bluetooth beacons, each with a 10 meter range, placed in an overlapping grid around the area of interest. In FIG. 1, the Bluetooth beacons are illustrated by an array of nine beacons, each of which is illustrated by star-shaped symbol, one of which is seen at 203. The nodes can inquire to find out which beacons are in range and figure out their location from this information. Other location systems, such as emerging UltraWide-Band (UWB) systems, RF-carrier phase-detection techniques, sequence lock timing, carrier amplitude, or various other RF or environmental sensing approaches can be used as well.

Some or all of the beacons can also serve as base stations for inserting information into and retrieving information from the sensor network. In our prototype, each Bluetooth beacon is comprised of a Bluetooth radio module, a power supply, and a Lantronix XPort, an Ethernet controller and a processor built into an Ethernet connector form-factor. The XPort allows quick and easy development of a sockets interface to the functions of the Bluetooth module.

With this network capability, the beacons can also be used to connect from a central location on the network to any of the nodes that are in range of any of the beacons. This facility can be used for test purposes to track the nodes, retrieve any collected data, or manually control the functions of the node.

The central monitoring software which operates at the monitoring station 230 maintains a list of IP addresses of the beacons in the systems, and can inquire to find out what nodes are in range of each beacon. It can then put together a node-centric view which will list all the nodes and allow connection to an individual node.

Mechanical Design

Figure 3:
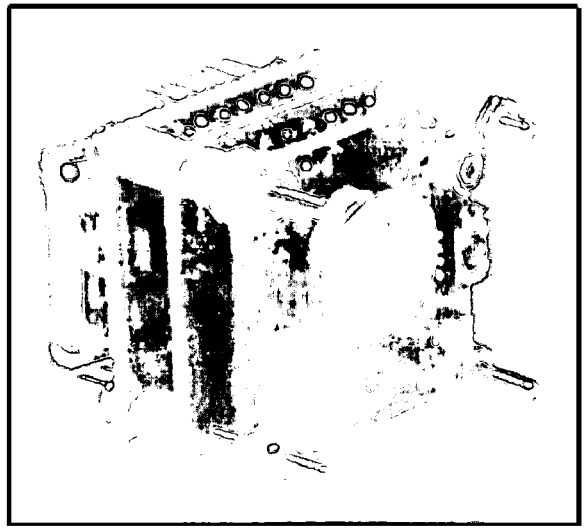
FIG. 3 is a photograph of an electronics module implementing a wireless network sensing node.

The electronics described in the preceding section need to be encased to form a physical device equipped with one or more mechanisms to support parasitic mobility. The electronics components are shown in the photograph seen in FIG. 3. As noted above, we have identified four types of parasitic mobility attachment/detachment mechanisms: active, passive, semi-passive, and attraction/value-added. In this section, hardware designs to support each of these four types of mechanisms are described.

Active Node Design

A first node design implements an active node which imitates the natural parasitic behaviors of fleas and ticks and consists of a hopping robot that can sense a nearby object, hop at it or onto it, and attach. The mechanism also includes means for detaching on command and falling off the host.

This active node is 40 mm tall by 30 mm wide by 30 mm deep, including a mechanical launching mechanism and all electronics, comprised of the power module with battery, processing and communication layer, and sensor/actuator module as described above in connection with FIG. 1.

Figure 4:
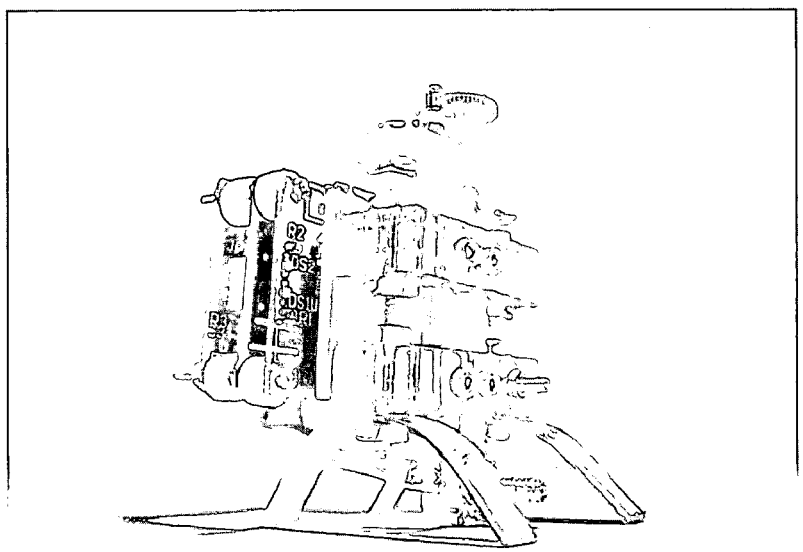
FIG. 4 is a photograph of an active sensing node adapted to hop onto and then be carried by a moving host.

The active node device is shown in the photograph seen in FIG. 4 and consists of the electronics (seen separately in FIG. 2) mounted to a frame consisting of 3 horizontal bars and two vertical bolts using nuts to position the plastic crossbars. The frame also contains two aluminum feet to hold the node upright, ready to jump. In an enhanced version, the node would be housed in a self-righting egg-shaped plastic case.

Figure 5:
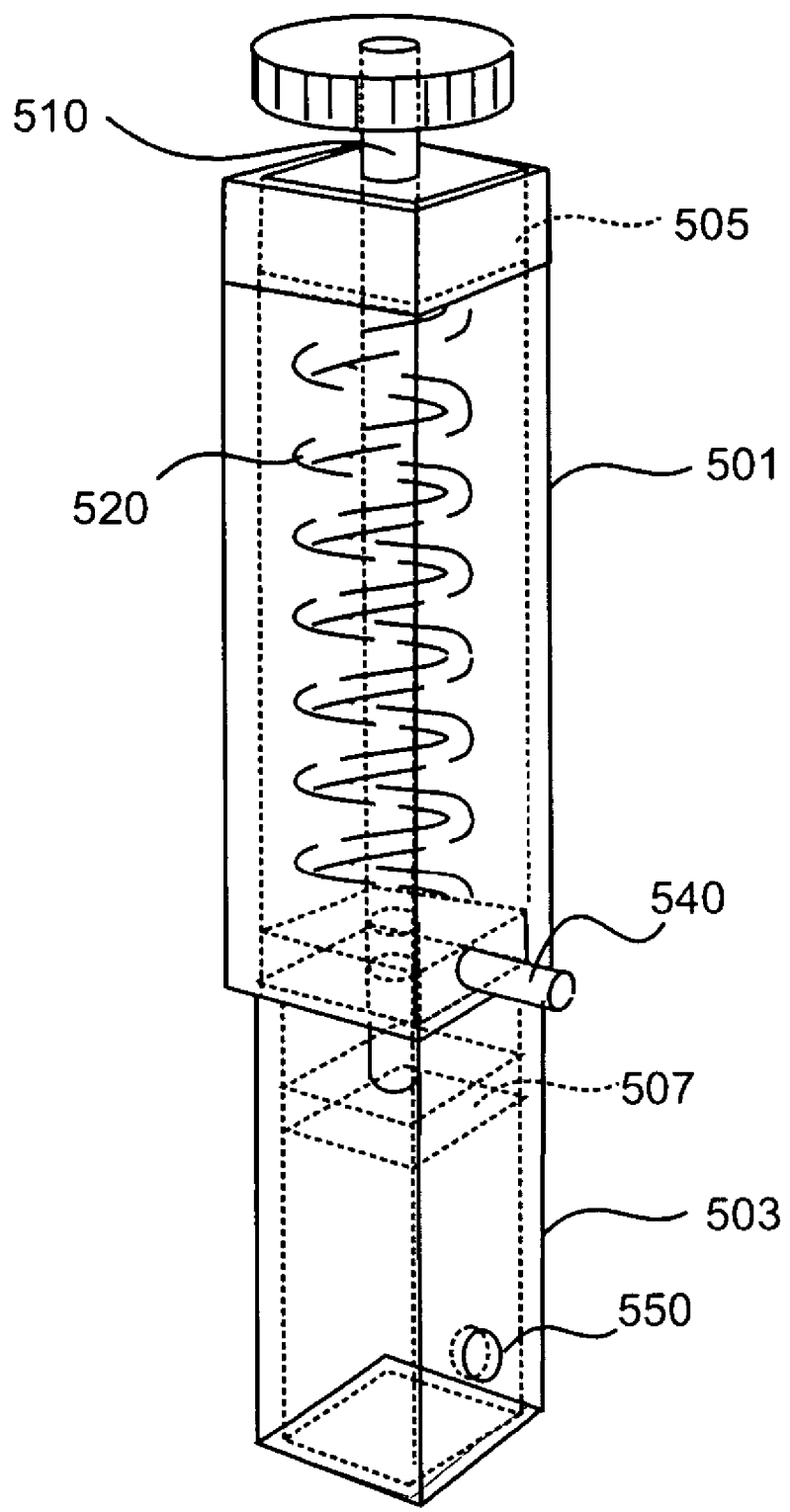
FIG. 5 is a perspective view of a mechanism for propelling a sensing node onto a moving host.

Down the center of the frame are the hopping piston seen and a planetary-geared, 8 mm in diameter motor used to reset and release the piston. The design of the piston is shown in FIG. 5.

The hopping actuator is designed around two telescoping square tubes 501 and 503. Both of the tubes have plastic end caps seen at 505 and 507 with a hole for the threaded rod (lead screw) 510 to pass through the middle of the piston. Around the lead screw in the outer tube 501 is a spring 520. By turning the lead screw, the lead nut 507 located inside the inner tube is pulled upwards, compressing the spring 520, and pulling the inner tube 503 up inside the outer tube 501. When the inner tube is pulled completely inside the outer tube, a spring plunger seen at 540 latches the inner tube in place through a hole 550 near the bottom end of the inner tube.

Once the inner tube is latched, the motor is no longer under any strain and can be disengaged until it is time to hop. When it is time to hop, the motor reverses and sends the lead nut 507 downwards until it hits the plunger 540 on the inside of the inner tube. When the lead nut keeps going, it will push the plunger 540 outwardly and release the latch. This will free the spring 520 to expand, pushing the inner tube 503 downward and causing the node to hop. For more precision, the motor can reverse after the latch engages, and stop with the lead nut just above the latch. In this state, it is ready to trigger a hop on a moments notice. A alternative design would allow the node to be deployed with a spring pre-wound for a certain number of hops.

The node was then equipped with five hooks protruding in all directions, each with a curvature of 1 inch in diameter. The robot would hop to heights around 8 cm from the ground at an angle of around 70 degrees. Due to the placement of the motor and the battery it always hopped in the same direction relative to itself. This height proved enough to hook into a person's pant leg or shoe. Other attachment devices were tried including Velcro and silicon adhesive, but only a large hook could grab clothing, given the irregularities in the approach vector. Other attachment mechanisms such as shuttered magnets for vehicles and electrically activated adhesives could be employed; although most of these methods were deemed unsuitable for use with on humans as moving hosts.

Semi-Passive and Passive Node Design

Nodes may also employ semi-passive and fully passive attachment and detachment mechanisms, resulting in significant power savings compared to active nodes.

Figure 6:
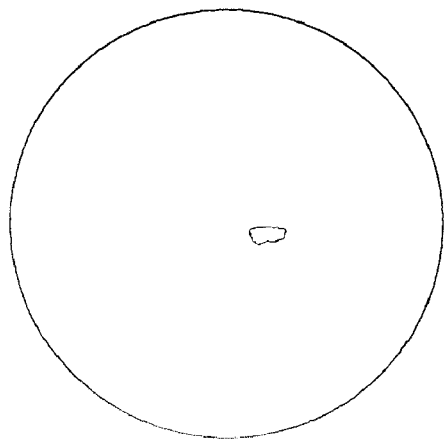
FIG. 6 is a photograph of a passive sensing node mounted in a spherical housing.

To build nodes of this type, the electronics were enclosed in a plastic sphere seen in FIG. 6 with an outer diameter of two inches. The electronics were attached strongly to the spherical case, allowing the pager motor's vibrations to affect the external surfaces.

To make these spherical devices into semi-passive nodes, the surface was coated with a polyester double-sided adhesive tape from 3M Corporation, 3M Center, St. Paul, Minn. 55144. Polyester tape was chosen because it can stretch and form a tight, smooth layer around the sphere. It is necessary that the surface is smooth to prevent too much of the surface from sticking to a host, making it difficult for the ball to shake loose. The polyester tape is very thin and works perfectly in this regard. It is available in a wide range of sticking strengths. Through trial and error, the appropriate stickiness was found that allowed the ball to easily stick to anything it touched and remain stuck until it is shaken loose from inside with the pager motor.

In order to create passive nodes, a different adhesive needed to be used. The bond, when attached, would have to degrade over time, allowing a new bond formed on the opposite side of the sphere to be the stronger bond allowing the node to be pulled from its original host. If no new host came about, the bond would degrade and the node would eventually fall free without the use of the pager motor or any form of actuation. Various consistencies of silicon were mixed and tested. Through this trial and error, a working silicon adhesive was created that performed as desired. When a bond was made, the silicon would get weakened at the spot of the bond by getting soiled by the host's surface. This worked quite well; however, the ball would have a limited number of attachments before it became too dirty to stick at all. The polyester tape did not have this problem because it was much stickier and less greasy, but required the pager motor to dislodge it. Other attachment mechanisms, such as devices based on hooked microstructures, could also be used for parasitic nodes.

Value-Added/Attraction Node Design

The basic spherical node seen in FIG. 6 without any sticky surface falls into this category by way of its full spectrum LED. This LED can be programmed to display attractive patterns that catch the eye of a passerby, which was found to work particularly well in an academic research institution where everyone is attracted to blinking lights and novel objects of technology. Once attracted, the host can receive instructions from the node as to what the node does and what the host can do with it. For example, a label that can be applied to the node to give the host specific instructions, such as "PICK ME UP AND TAKE ME WITH YOU, BUT PUT ME DOWN WHEN I SHAKE."

The nodes can then reward their attracted host for following the instructions. Example rewards can be discounts provided on purchases while carrying the node, or providing useful information to the host. When the node wants to be dropped off, it can stop providing these rewards, vibrate or make a sound signaling a desire to be put down, and/or turn off the LED until it is ready to be picked up again.

Firmware Design

The node's behavior is controlled by firmware programs executed by the microcontroller. This firmware consists of three elements: (1) data structures that hold state information, behavior information, and map information; (2) background processes that handle actions implemented in hardware or through the use of hardware peripherals such as the wireless communication and the sensor readings; and (3) the main firmware code that controls the node's activity.

Data Structures

The basic data structures used by the firmware to store its internal information are listed below. There are four basic data structures used in the firmware. The first structure, location, contains information to identify a location in a coordinate system. The structure uses both the Bluetooth location system, which gives an XY coordinate, and the GPS system, which returns the coordinates in longitude and latitude.

Location Record Data Structure

| Name | Data type |
|---|---|
| btX | integer |
| btY | integer |
| latDir | character |
| latDeg | integer |
| latMin | integer |
| latSec | floating point |
| lonDir | character |
| lonDeg | integer |
| lonMin | integer |
| lonSec | floating point |

Behavior Data Record Structure

| Name | Data type |
|---|---|
| powerThreshold | integer |
| goal | location |
| gotoGoal | character |
| stopAtGoal | character |
| coverage | character |
| LightThreshold | integer |
| VibrationThreshold | integer |
| TemperatureThreshold | integer |
| AltitudeThreshold | integer |
| AudioThreshold | integer |
| senseTime | integer |
| stopTime | integer |
| hopsPerLocale | integer |

Map Data Record Structure

| Name | Data type |
|---|---|
| good | location |
| bad | location |
| visited | location |
| unvisited | location |

Node Data Record Structure

| Name | Data type |
|---|---|
| sensors [ ] | array of integer |
| powerLeft | integer |
| hopsRemaining | integer |
| senseTicks | integer |
| state | character |
| current | location |
| map node_map | map |
| node_behavior | behavior |

The map structure is used to store geographic information. This structure is created from lists of locations. The first list includes locations considered as good. These locations are ones that the node considers as attractive to visit. These can be locations known to have a high host frequency or hosts that are most likely to bring a node to a point of interest. The structure also contains a list of bad locations, which are locations that are known to have a low host frequency or to be a dead end. Good and bad locations can be entered manually, either prior to deployment or over a communication channel if available. They can further be discovered and identified by the nodes themselves. Once discovered, a node can broadcast these locations to any other nodes in range. The map structure also contains a list of the locations visited and a list of the locations that are known to be unvisited. These lists are used by a node trying to maximize coverage. Like the good and bad locations, the unvisited locations can be entered in manually or discovered and transmitted from node to node.

The behavior structure holds data that is very similar to the parameters identified above in the discussion of the node behavior in the software simulator. Please refer to this section for details about the corresponding behavioral parameters.

The last data structure is the main structure for the node, including instances of the map and the behavior structure. This structure contains the current state, which uses the enumerated values of idle, attached, or sensing. The senseTicks variable is an internal counter that tracks the time left. The hopsRemaining variable is also an internal variable used to track how many hops have happened at the current location. The sensors array contains the current value of the six sensors in the sensor unit 123 (accelerometer, microphone, proximity detector, temperature sensor, altitude sensor, and light senor) and the powerLeft variable stores the remaining time left on the current charge of the battery. Finally, the node structure contains the current location returned from the location system.

Background Processes

The chosen microcontroller and the hardware design combine to allow several activities to happen without taxing the main program loop.

The first of these systems is the Bluetooth radio seen at 113 in FIG. 1. The radio module contains an embedded processor with a Bluetooth communication stack. This stack defaults to a mode where other nodes can find it, connect to it, and communicate to it. The data is then passed to the processor through a serial connection. On the processor side, the serial communication is handled by a hardware UART and the data reception is interrupt-driven. The serial interface is set to a speed of 9600 bits per second to allow successful operation in the low power mode running at a processor speed of 32 kHz.

Most of the possible wireless communication packets contain information that gets stored in the node's data structures for the main loop to use in its state machine. This happens completely in the interrupt service routine and the data is immediately available to the main loop.

The environmental sensors in the sensor unit 123 are read using the analog to digital conversion hardware built into the microcontroller 111. This is also an interrupt-driven processor. After the conversion is finished, the interrupt service routine stores the values in the sensor array. The sampling is much slower when the node is in the low-powered idle state. In this state, the sensors are mainly used to detect when the node has been picked up and should transition to the attached state. The lower sampling rate is still adequate to identify this occurrence.

The battery life is monitored by a specialized gas gauge chip 131. However, the interface to read the battery life value from this chip is not connected to a hardware peripheral in the microcontroller and hence must be controlled in the firmware. Furthermore, this communication is too fast to be performed in the low power mode. This proves to be adequate since the power drain in the low power mode is so minimal. Accordingly the battery life is checked routinely during the attached and sensing states.

Main Firmware Execution Code

Figure 7:
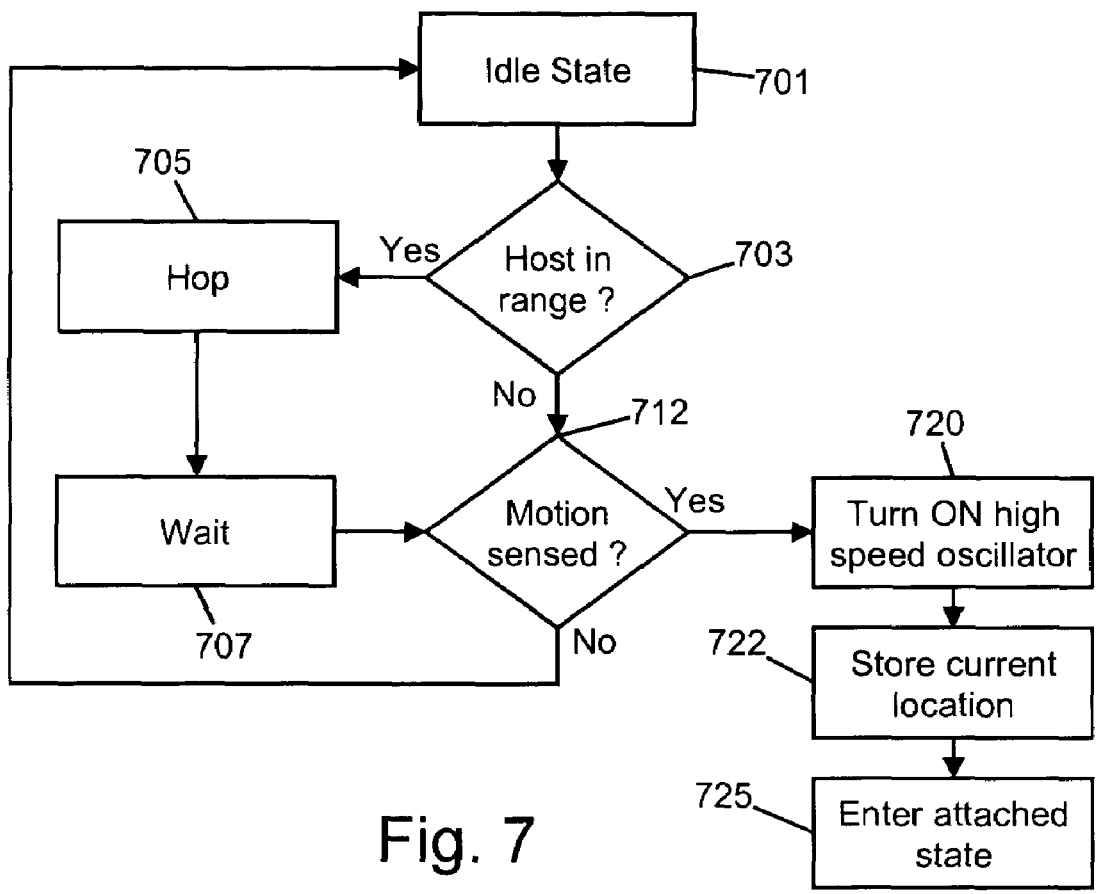
FIG. 7 is a flowchart illustrating the processing steps performed in when a sensing node is in the idle state.
Figure 8:
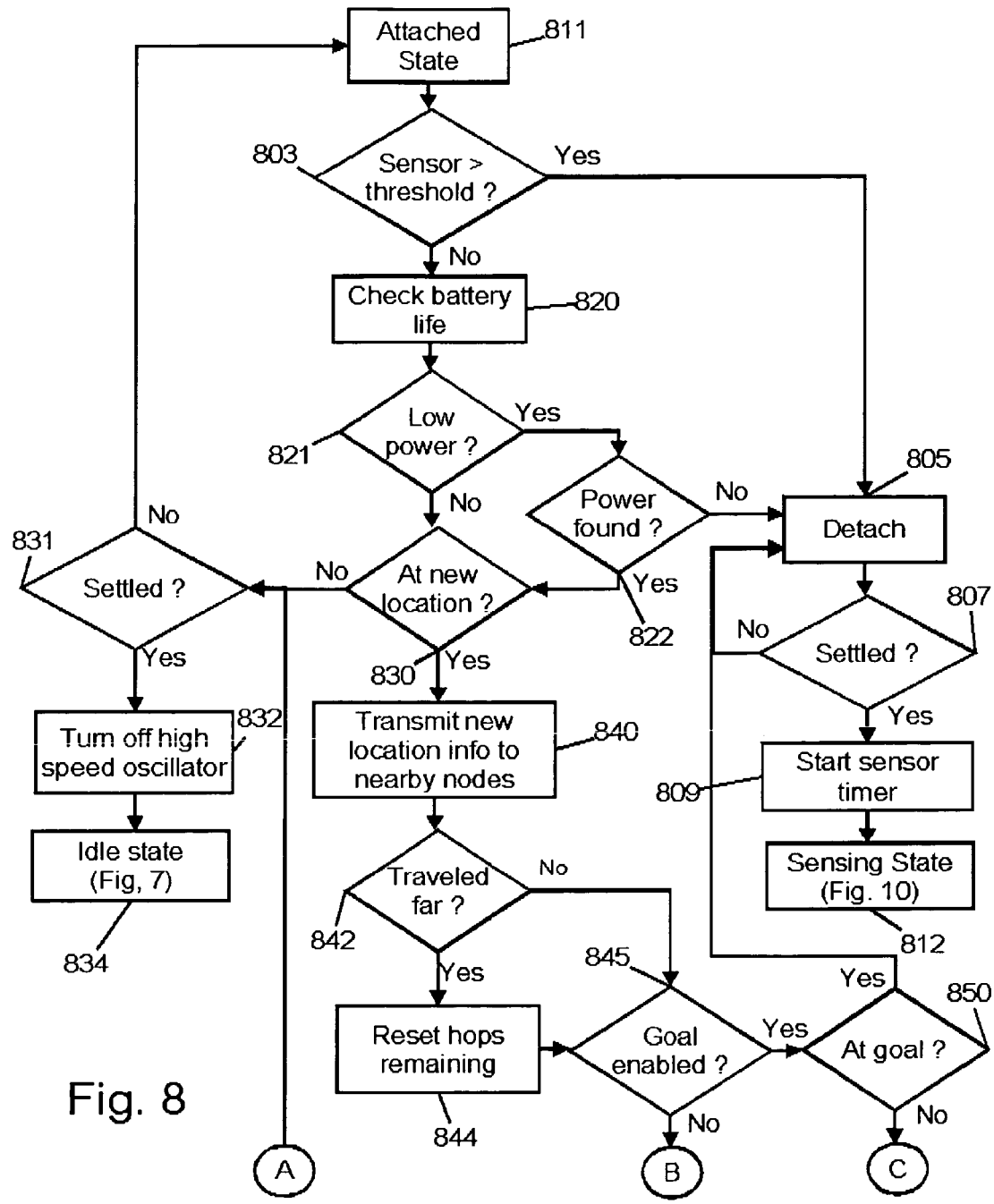
FIGS. 8 and 9 are flowcharts that together show the processing steps performed when the sensing node is in the attached state.
Figure 9:
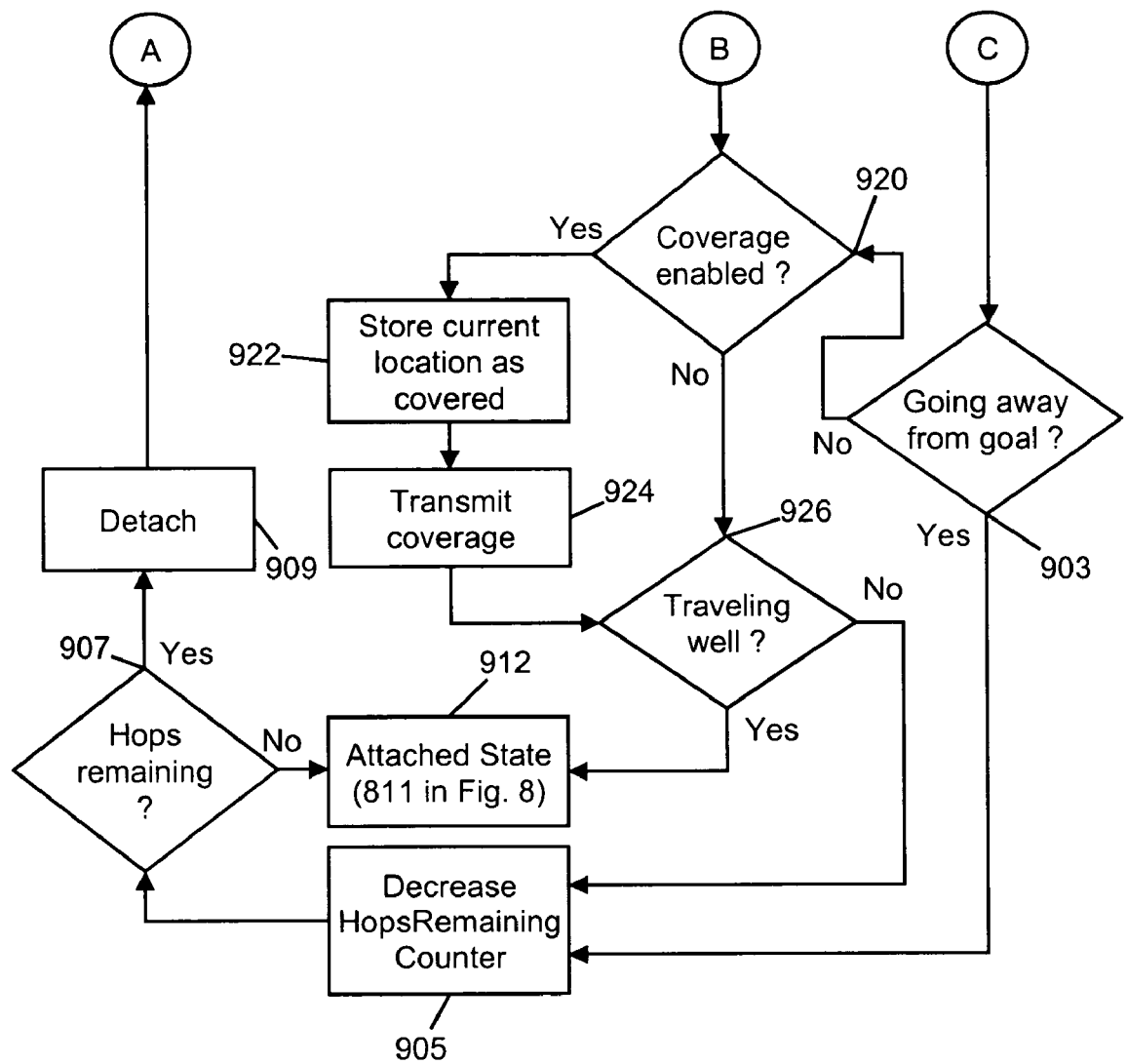
Figure 10:
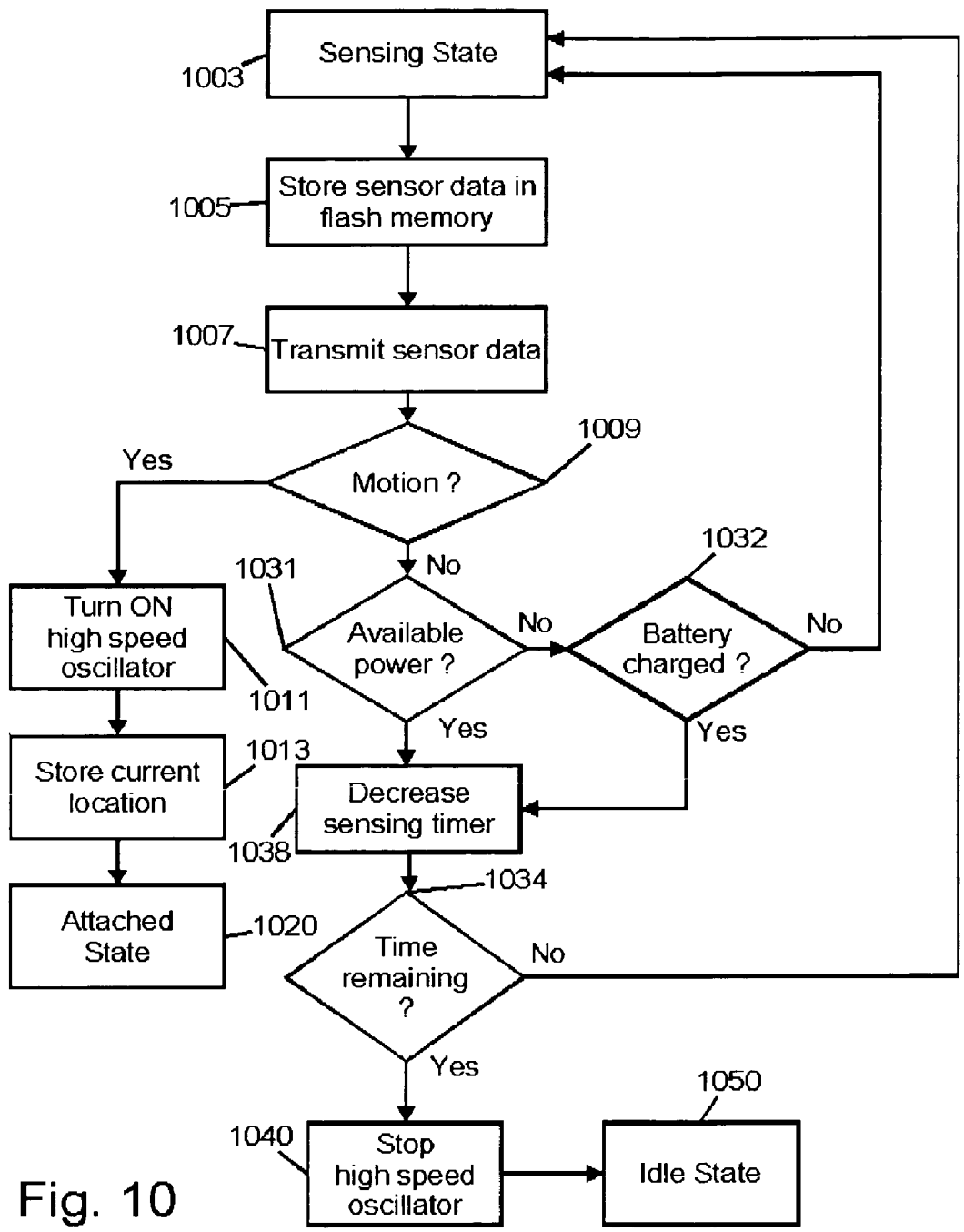
FIG. 10 is a flowchart showing the processing steps performed when the sensing node is in the sensing state.

The main firmware execution can be illustrated by the flowcharts which appear in FIGS. 7-10. The flowchart of FIG. 7 illustrates the idle state, FIGS. 8 and 9 illustrate the attached state, and FIG. 10 shows the sensing state. These flowcharts describe the general firmware flow for a generic parasitic node based on the ideas developed from the software simulator and may be readily modified to support many specific sensor network applications.

It is important to note that the sensing state of FIG. 10 is the state where the node has detached and is collecting data, but it is not the only time the sensor data can be collected. The sensors are fully active in the attached state of FIGS. 8 and 9 and the data can be stored or collected in this state as well. It is also possible to collect data in the idle state shown in FIG. 7, but with a sacrifice of power depending on the sampling rate and how many sensors are active. Furthermore, it is possible to combine the idle state and the sensing state into one state that is always collecting data and looking for a host.

In general, the three states exist only for power management reasons. The states allow the node to enable and disable peripherals and functions according to what the node needs in a particular state. For applications with less of a power restriction, the node can always be sensing, checking its location and power, and calculating whether it should detach or attach.

For semi-passive and passive nodes, the node can transition to the attached state from either the idle or the sensing state when it senses that it is moving. This is shown in FIG. 10. Active nodes, on the other hand, can control their state change into and out of the attached states.

In the idle state depicted in FIG. 7, entered at 701, the node is seeking a moving host to which it can become attached in order to move to a more desirable location. If it is an active node and senses that a host is in range using its proximity detector as indicated at 703, it will execute a hop at 705 in an effort to come attach itself to a moving host. After a short waiting period at 707, the node will use its accelerometer and/or location methods at 712 to determine if it is in motion. If not, the node returns to the idle state to await the arrival of another potential host. If it is motion, then node turns on its high speed oscillator to bring the processor to life at 720, stores its current location at 722, and enters the attached state at 725.

In the attached state seen at 811 at the top of FIG. 8, the node checks the signal values being produced by its environmental sensors against the threshold levels for those sensors. If the test at 803 any of the sensor thresholds is exceeded, the node attempts detaches itself from the moving host as indicated at 803. After the detach operation is executed, the node then determines whether or not it has come to rest at 807. If not, it again attempts to detach itself. If at rest, the sensor timer is started at 809 and the node reenters the sensing state as indicated at 812 (see FIG. 10 for sensing state functions).

If the tests at 803 do not identify any sensor reading being above its threshold, the battery life value from the gas gauge chip 131 is checked at 820. If a low power condition is detected at 821, a test is performed at 822 to determine whether the node is at a location where a power source is available to recharge the battery, in which case the node detaches.

If the test at 830 indicates that the node has not traveled to a new location, and has not settled (i.e. is still being carried by its moving host) as indicated at 831, the node reenters the attached state at 811 to repeat the process described above.

Otherwise, the node turns OFF its high speed oscillator to conserve power at 832 and reenters the idle state as indicated at 834.

If the node has traveled to a new location as indicated by the test at 830, it sends data specifying its new location to nearby nodes as seen at 840. If this new location is far from the last location identified as indicated at 842, the node resets its hopsRemaining variable as seen at 844. If the node's stopAtGoal variable is set to true, as indicated at 845, the node determines whether its current location matches the desired location specified by the goal variable at 850, and if the goal location has been reached, the node attempts to detach itself at the current location at 805.

If the node has not yet reached its goal, and stopAtGoal is true, the node then determines whether or not it is going away from or moving toward the desired goal location as indicated at 903 in FIG. 9. If the node is moving away from its goal, it decrements the HopsRemaining counter at 905 and then determines if that counter has been decremented to zero at 907. If there are HopsRemaining, the node attempts to detach itself as seen at 909 and then performs a test as seen at 831 in FIG. 8 to determine if it has settled. If there are no HopsRemaining, the node remains attached and returns to the attached state at 912 at which point processing continues from the entry point 811 seen in FIG. 8.

If the node has been instructed to monitor and report on the locations covered by setting the coverage variable to true, as indicated by test seen at 920 in FIG. 9, the node stores the current location as being covered at 922 and transmits that information to nearby nodes at 924. The node then attempts to determine whether it is traveling well (that is, is traveling in the right direction and at an adequate rate) at 926. If not, it proceeds to step 905 discussed above in preparation for possibly detaching itself. If the node is traveling well, it returns to the entry point 811 for the attached state as seen at 912, As indicated at 812 in FIG. 8, the node enters the sensing state when it has moved to a location at which sensing activities are to be performed. The sensing state when entered at 1003 in FIG. 10 begins by storing data from the sensing unit in the unit's flash memory as seen at 1005, transmitting that sensor data to nearby nodes at 1007. It the node is not in active mode, a test is performed determining whether or not the node is in motion at 1009. If the node is in motion, its high speed oscillator is turned ON at 1011, the current location is stored in memory at 1013, and the node reenters the attach state (at 811 in FIG. 8) as indicated at 1020.

If the test at 1009 indicates that the node is not in motion, tests are performed at 1031 and 1032 to determine if there is power available or the battery is charged. If either is true, the sensing time is decremented and, if there is remaining sensing time at determined at 1034, the node is maintained in the sensing state. If not the high speed oscillator is stopped as indicated at 1040 to conserve power and the node is placed in the idle state at 1050.

Possible Applications of Parasitic Mobility

In certain environments, parasitic mobility can be used as a replacement for standard mobility for dense, distributed sensor systems. Systems of this sort include applications to sense toxic areas requiring sensor deployment at a safe distance, dynamically reconfigurable systems such as weather monitoring sensors that need to follow the relative phenomena, and systems where the accuracy of node deployment is minimal such as for nodes being released in water or from a (air, land, or sea) vehicle. Efficient coverage of an environment can be obtained as the sensors shift from host to host to either sense a set of positional goals or keep moving to cover a wide area. Advantages for military reconnaissance and security applications are obvious—sensors can be seeded into an environment far from hostile or enemy-held areas, and they will progressively make their way towards their goals by hitching successive rides on unsuspecting hosts.

Going further, parasitic mobility can possibly lead to applications that can only be done (or are better done) with parasitic mobility than standard mobility. Any example where the host behavior is part of what is desired to be monitored would fit this category. In these systems, parasitically mobile nodes would attach to their subjects and would always be at the points of interest.

One application that would be interesting to explore is the idea of a rating system based on breadcrumb trails. Essentially, the parasitic nodes would attach to hosts and pool up in spots of high traffic. These points can propagate through the system and provide information on the popularity of certain pathways and locations.

Another application of parasitic mobility needs no environmental sensors beyond the radio-nodes can be directed to move into positions to relay communications and close gaps in a network (or dynamically reconfigure to define an optimal network topology).

Enhancements

The systems described above may be further perfected, e.g., a first step would be to increase the performance of the system by increasing the sample rate of the sensors, increasing the onboard processing power, and increasing the resolution and refresh rate of the location system. By increasing the node's capabilities, it will be possible to give the nodes more information about the environment such as onboard databases of map information.

Employing mechanisms for harvesting operating power from the environment would allow self-maintaining, perpetually operating systems to be deployed. These systems can harvest the power from their environment (taking inspiration from the tick, which harvests chemical energy from its host) or from forces acted upon the nodes, such as when they are in the attached state. Smarter power management can be applied, as well as power adaptive sensing, to improve battery conservation.

Adding more distributed, node-node communication to the system would open up some new venues for research. By collaboration, the sensor nodes could optimize their mobility and detachment and attachment algorithms.

New types of attachment and detachment mechanisms could lead to new applications of parasitic mobility, e.g. attaching to vehicles. Also, sensor nodes may be embedded into everyday objects that commonly move about, such as pencils. These directions can benefit from smaller nodes. Adding different kinds of sensors (e.g. a camera, a proximity sensor, a motion sensor, and a magnetic sensor) can also allow detection and attachment to a larger variety of hosts, as well as a wider range of sensing applications.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. A method for transporting a device capable of wireless communication to a desired location comprising the steps of:
   coupling the device to a moving host such that the host carries the device with it, decoupling the device from said moving host when said device has been carried to a desired location, and decoupling said device from said moving host if it is determined that said moving host is carrying said device away from said desired location.

2. A method for transporting a device capable of wireless communication to a desired location as set forth in claim 1 further including the step performed when said device has been carried to said desired location of maintaining the position of said device at said desired location.

3. A method for transporting a device capable of wireless communication to a desired location as set forth in claim 1 further including the steps, performed when said device has been carried to said desired location for a predetermined time duration, of:

coupling the device to a new host such that the host carries the device with it and maintaining the coupling of the device to the new host until the device has either been carried to a second desired location or it is determined that the host is carrying the device away from said second desired location.

4. A method for transporting a device capable of wireless communication to a desired location as set forth in claim 1 wherein said device is powered by a battery carried with said device and further comprising the steps of:

detecting a low level of energy available from said battery and altering said desired location to a new desired location where a source of electrical energy for recharging said battery is available.

5. A method for transporting a device capable of wireless communication to a desired location as set forth in claim 1 wherein said device needs to report or receive information and further comprising the steps of:

detecting the state where the node's priority is to report or receive information (or receive new instructions)

altering said desired location to a new desired location where the node can be easily retrieved, or where wireless access is available (from other networked nodes or from another wireless infrastructure).

6. A method for transporting a device capable of wireless communication to a desired location as set forth in claim 1 further including the steps of maintaining a database which specifies a plurality of desirable locations and wherein said desired location is one of said desirable locations.

7. A method for transporting a device capable of wireless communication to a desired location as set forth in claim 1 including the steps of maintaining a database which specifies a plurality of undesirable locations and wherein said desired location is prohibited from being one of said undesirable locations.

8. A method for transporting a device capable of wireless communication to a desired location as set forth in claim 7 including the steps of maintaining a database which specifies a plurality of desirable locations and wherein said desired location is one of said desirable locations.

9. A movable sensor comprising, in combination, means for coupling the sensor to a moving host such that the host carries the sensor with it, a location detector for determining the current location of said sensor, a comparator for comparing said current location to said desired location, and means for decoupling said movable sensor from said moving host when said comparator indicates that said sensor has arrived at said desired location.

10. A movable sensor as set forth in claim 9 further comprising:

means coupled to said location detector for determining the direction of movement of said sensor when said sensor is coupled to said moving host, and means for decoupling said sensor from said moving host when said direction of movement is away from said desired location.

11. A sensing network comprising a plurality of sensing nodes, each given sensing node comprising, in combination:

at least one sensor for measuring a condition in the vicinity of sensor, a wireless communications device for exchanging data with other sensing nodes in said network that are near said given sensing node, means for attaching said given sensing node to moving host as said moving host moves near to said given sensing node, and means for subsequently detaching said giving sensing node from said moving host when said moving host carries said given sensing node to a desired location.

12. A sensing network as set forth in claim 11 wherein said means for attaching said given sensing node to a moving host comprises means for propelling said given node into contact with said moving host and coupling means for securing said given node to said moving host when said given node is in contact with said moving host.

13. A sensing network as set forth in claim 11 wherein said means for attaching said given sensing node to said moving host is comprises an adhesive affixed to the surface of said sensing node.

14. A sensing network as set forth in claim 11 wherein said means for attaching said given sensing node to said moving host comprises means for inducing said moving host to acquire said given sensing node and to thereafter carry said sensing node with it for at least a limited time.

15. A sensing network as set forth in claim 14 wherein said given sensing node further includes means for encouraging said moving host to cease carrying said given sensing node when said given sensing node has been carried to said desired location.

16. A sensing network as set forth in claim 14 further including means for encouraging said moving host to detach said given host when it is determined that said given sensing node is being carried in a direction away from said desired location.

\* \* \* \* \*